United States Patent

[11] 3,615,577

[72] Inventor Robert Charles Desjarlais
South Hadley Falls, Mass.
[21] Appl. No. 880,901
[22] Filed Nov. 28, 1969
[45] Patented Oct. 26, 1971
[73] Assignee The Plastic Coating Corporation
South Hadley, Mass.

[54] PREVENTION OF INACTIVATION OF COUPLING COMPONENTS IN REVERSAL DIAZOSULFONATE PHOTOREPRODUCTION MATERIAL
6 Claims, No Drawings

[52] U.S. Cl. ........ 96/91 R, 96/49
[51] Int. Cl. ........ G03c 1/56, G03c 1/60
[50] Field of Search ........ 96/49, 75, 91

[56] References Cited

UNITED STATES PATENTS

| | | | |
|---|---|---|---|
| 2,854,338 | 9/1958 | Herrick et al. | 96/49 |
| 3,479,183 | 11/1969 | Habib et al. | 96/49 |

*Primary Examiner*—Norman G. Torchin
*Assistant Examiner*—Charles L. Bowers, Jr.
*Attorneys*—Wm. J. Foley, John A. Weygandts, John W. Kane, Jr., S. T. Hadley, A. J. McNulty and M. L. Faigus

ABSTRACT: A reversal diazosulfonate composition and photoreproduction material containing N,N' diaryl-substituted alkylene diamines and humectants to prevent inactivation of coupling components.

PREVENTION OF INACTIVATION OF COUPLING COMPONENTS IN REVERSAL DIAZOSULFONATE PHOTOREPRODUCTION MATERIAL

BACKGROUND OF THE INVENTION

1. Field of the Invention

The invention described herein was made under a contract with the U.S. Air Force. The present invention relates to photosensitive diazosulfonate formulations and to diazophotographic reproduction materials made therefrom.

2. Description of the Prior Art

In U.S. Pat. application, Ser. No. 464,447, now U.S. Pat. No. 3,479,183 issued Nov. 18, 1969 there is disclosed and claimed a negative-working or reversal diazo-photographic reproduction (photoreproduction) material made from a composition comprising a para-amino benzene diazosulfonate, a coupler (i.e., a color former) therefor and a substantially nonvolatile amine. This composition is applied as a discrete layer upon the surface of a support. The resulting light-sensitive material is useful for photographically reproducing images contained in master transparencies, such as microfilm, engineering drawings, and aerial photographs, through the action of light on the diazo composition.

The image-producing process described in the aforementioned patent application comprises the steps of imagewise exposing the diazo imaging material to actinic illumination (blue violet and ultraviolet light) to convert the diazosulfonate to an active diazonium compound which couples with a coupling component to provide a dye-image in the light-struck areas; acidifying the discrete layer with acid vapor; and light clearing the unreacted diazosulfonate by exposing it overall to actinic illumination, thereby forming colorless decomposition products of the diazosulfonate to produce a stable, fixed, dye-image against a clear background. The mechanism of the negative-working diazosulfonate process during the light-clearing step may be represented in the following manner:

$$ArN_2SO_3M+H^+ \xrightarrow{h\nu} ArN_2^+HSO_3⅓+M^+$$

$$ArN_2^+HSO_3^{1}+H_2O \xrightarrow{h\nu} ArOH+H_2SO_3+N_2\uparrow$$

wherein Ar is a para-amino benzene radical and M is an alkali metal.

The coupling component in the alkaline medium of the reversal diazosulfonate imaging formulation of the above-mentioned patent application has shown a tendency to oxidize, and hence become inactive. As a result, processing of aged film often resulted in poor image density.

Accordingly, it is an object of the present invention to provide a diazosulfonate imaging formulation containing compounds which inhibit the oxidation of the coupling components. Another object is to provide a diazosulfonate imaging composition which forms images of good density after storage for a substantial period of time.

SUMMARY OF THE INVENTION

In accordance with the present invention, oxidation of the coupling components in the above-described diazosulfonate imaging formulation is inhibited by the incorporation of N,N' diaryl-substituted alkylene diamines. While the present invention does not wish to be bound to any particular theory as to the mechanism by which these amines prevent oxidation, it is believed that these compounds prevent the oxidation of the coupling components by chelating trace impurities of metal which promote oxidation and/or by preferentially undergoing oxidation in place of the coupling component.

The present inventor has found that still further improvement in shelf life can be achieved by employing a humectic organic polyhydroxy compound in combination with the antioxidant of the present invention. Humectic, organic polyhydroxy compounds, such as the glycols, mannitols, and sorbitols, serve as humectants to prevent the coating from drying out. The humectant effect of the organic polyhydroxy compounds is not sufficient, however, to account for the improved aging achieved in accordance with the present invention. Although there is no readily apparent explanation for the synergistic behavior of the humectant upon the antioxidant of the present invention, the humectant may possibly be acting as a chelating agent for metal impurities, and thereby allowing the antioxidant amines to oxidize preferentially rather than chelate with the metal impurities. In this manner, the antioxidants are made more effective in preventing the couplers from oxidizing. Regardless of the theory, the present inventor has found that the shelf life of reversal diazosulfonate imaging formulations can be substantially improved by the incorporation of an antioxidant defined by the formula given hereinafter, and that still further improvement can be achieved by the use of these antioxidants in combination with humectic, organic polyhydroxy compounds. Other principles, features, and advantages of the present invention will be more fully understood from the following detailed description.

DETAILED DESCRIPTION

The anti-oxidants which have been found to be useful in preventing oxidation of the coupling components in the diazotype materials of this invention are N,N'diaryl-substituted alkylene diamines. These inhibitors have the general formula:

ArNH—R—HNAr wherein Ar is a group selected from the class consisting of a phenyl group or a hydrocarbyl-substituted phenyl group wherein the hydrocarbyl substituents are in either the meta or para position and R is a divalent hydrocarbon radical having a chain of either two or three carbon atoms separating the nitrogen atoms of the diamine. Preferred are compounds wherein Ar is a phenyl group, m-tolyl group or p-tolyl group; and R is an ethylene group, a methyl-substituted ethylene group, a 1,2-dimethyl-substituted ethylene group, an ethyl-substituted ethylene group or a phenyl-substituted ethylene group. Illustrative of such compounds are compounds such as N,N'-diphenyl ethylene diamine:

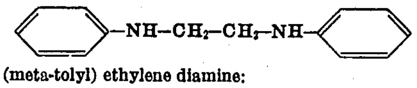

N, N' di (meta-tolyl) ethylene diamine:

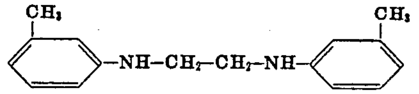

N, N' di (para-tolyl) ethylene diamine:

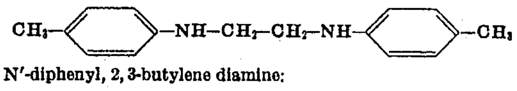

N, N'-diphenyl, 2, 3-butylene diamine:

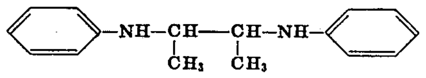

N, N'-diphenyl, 1, 2-butylene diamine:

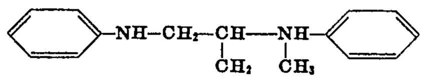

and N N'-diphenylstyrene diamine:

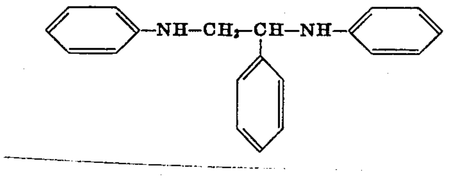

Although the amount of antioxidant which is employed in a coating composition has not been found to be narrowly critical, from about 0.10 part by weight of inhibitor per 100 parts by volume of the solvent for the coating mixture to about 4.0 parts by weight of inhibitor per 100 parts by volume of the solvent for the coating mixture is preferred, with about from 0.5 part by weight to about 1.0 part by weight being particularly preferred. Mixtures of these background antioxidants may also be employed, as well as mixtures of these types of inhibitors with other types of inhibitors or antioxidants.

Inhibitors having the general formula:

ArNH—R—HNAr, wherein Ar and R are as hereinbefore defined, can be prepared by reacting an aromatic amine such as aniline, para-toluidine, meta-toluidine, and the like, with a dihalosubstituted alkane or aralkane, such as ethylene dichloride; 1,2, dibromobutane; 2,3 dibromobutane; 1,2 dibromopropane; styrene dibromide and the like. This reaction is a known reaction (cf., for example, Bennett, G. M. "Journal of the Chemical Society" 1919, 115, 557), and can be illustrated by the general equation:

$$4ArNH_2+X-R-X \rightarrow ArNH-R-HNAr+2ArNH_3^+X^-$$

wherein Ar, and R are as hereinbefore defined and X represents a halogen such as bromine or chlorine.

The reaction is more specifically illustrated by the following preparation of:

N,N'-di-(para-tolyl)ethylene diamine: 42.8 Grams of para-toluidine,

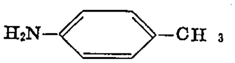

(0.4 mole) were added to 9.9 grams of ethylene dichloride, $Cl-CH_2-CH_2-Cl$, (0.1 mole); and the mixture was heated to reflux with stirring. At 135° C. a heavy precipitate began to form, and the mixture reached reflux temperature at 150° C. After refluxing at 150° C. for two hours, the mixture was cooled to room temperature, at which temperature the reaction mixture was a solid. The solid reaction mass was then stirred with 200 ml. of water and filtered. A brownish-yellow solid was recovered and recrystallized from hexane to yield 13 grams of a white solid which melted at 89° to 92° C. The N,N'di(para-tolyl)ethylenediamine product had the following carbon-hydrogen-nitrogen analysis:

| | Found | Theoretical |
|---|---|---|
| Nitrogen | 11.63 | 11.66 |
| Carbon | 80.25 | 80.00 |
| Hydrogen | 8.30 | 8.33 |

The infrared analysis of the N,N'-di(para-tolyl)ethylenediamine product was as follows:

Strong N—H secondary amine absorption band at 2.95 microns.

Strong N—H absorption band at 6.56 microns.

Very strong—$CH_2$'—absorption band at 6.85 microns.

Para-substituted doublet absorption bands at 12.34 microns and 12.42 microns.

A light-sensitive diazo composition of this invention is usually applied to a suitable base support in the form of a solution of the various components in a solvent or solvents, which is then dried to form a coated support material which can be imaged and developed in the manner described herein. The support may be any of the well-known support materials employed for diazo compositions, such as paper, cloth, transparentized paper, cellulose ester and ether films and polyester films having a subcoat thereon, such as Mylar film having a subcoat of cellulose acetate butyrate.

The following examples will serve to further illustrate this invention, but they are not intended to limit the scope thereof in any way.

EXAMPLE I

A light-sensitive coating formulation comprising the following components was prepared.

| Component | Amount |
|---|---|
| Methanol, cc | 52 |
| Acetone, cc | 38 |
| Methyl ethyl ketone, cc | 10 |
| Ortho-sulfobenzaldehyde, sodium salt, g | 4.0 |
| N-2-hydroxyethyl, N-cyclohexylamine, g | 1.0 |
| 2-hydroxy-3-naphthoic acid, 2,5-dimethoxy anilide, g | 1.2 |
| 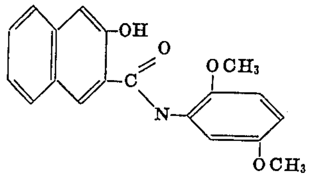 | |
| 1-hydroxy-2-naphthoic acid morpholide, g | 1.6 |
| 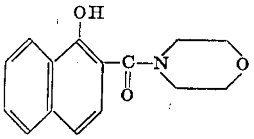 | |
| 4-(N-ethyl, N-benzylamino)-benzene diazosulfonate, sodium salt, g | 2.37 |
| N,N' diphenyl ethylene diamine, g | 1.0 |

This solution was bead coated onto a sheet of cellulose diacetate film and dried. A sample of the film was then exposed to actinic light under a partially opaque master to give a black image in the unprotected, i.e., light-struck areas. It was then acidified and cleared. Another sample of the unexposed film was tested for shelf life stability by placing it in a package which simulated commercial storage materials, and putting the package in an oven maintained at 50° C. for 3 days. This accelerated aging is equivalent to approximately 6 months of natural aging. When removed and printed it still gave a black image on a clear background. By comparison a control sample of film made from a formulation from which the N,N'diphenyl ethylene diamine had been omitted gave a yellow print on a yellowed background after the same aging. This is further illustrated by the following comparison of the maximum density (Dmax) of the image obtained after exposure and clearing, as measured by a photoelectric densitometer calibrated for visual density according to the ASA specification for diffuse transmission density, PH2.19–1959.

| | Initial Dmax | Dmax after 1 day's aging at 50° C. | Dmax after 3 day's aging at 50° C. |
|---|---|---|---|
| Control | 1.92 | 1.24 | 0.86 |
| Test sample | 1.90 | 1.60 | 1.37 |

EXAMPLE II 1.0 gram of N,N'di(meta-tolyl)ethylene diamine was substituted for the N,N' diphenyl ethylene diamine in the composition of example I. The following results were obtained:

| | Initial Dmax | Dmax after 1 day's aging at 50° C. | Dmax after 3 day's aging at 50° C. |
|---|---|---|---|
| Control | 1.92 | 1.24 | 0.86 |
| Example II | 1.81 | 1.75 | 1.21 |

EXAMPLE III 1.0 gram of N,N'di(para-tolyl) ethylene diamine was substituted for the N,N'diphenyl ethylene diamine in the composition of example I. The following results were obtained:

| | Initial Dmax | Dmax after 1 day's aging at 50° C. | Dmax after 3 day's aging at 50° C. |
|---|---|---|---|
| Control | 1.92 | 1.24 | 0.86 |
| Example III | 1.83 | 1.72 | 1.35 |

EXAMPLE IV

A light-sensitive coating formulation comprising the following components was prepared.

| Component | Amount |
|---|---|
| "Half-second acetate" (low viscosity cellulose diacetate), g | 16 |
| Methanol, cc | 30 |
| Acetone, cc | 70 |
| Polypropylene glycol (average molecular weight 400), cc | 3 |
| Ortho-sulfobenzaldehyde, sodium salt, g | 1.44 |
| 2-hydroxy-3-naphthoic acid-ortho-anisidide, g (2-hydroxy-3-naphthoic acid, 2'-methoxy-anilide) | 1.29 |
| 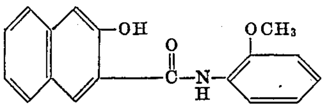 | |
| 1-hydroxy-2-naphthoic acid piperidide, g | 0.441 |
| 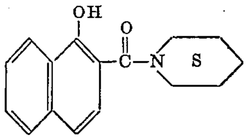 | |
| N-isopropyl, N-cyclohexylamine, g | 1.28 |
| N,N'diphenyl ethylene diamine, g | 0.5 |
| 4-(N-ethyl, N-benzylamino) benzene diazosulfonate, sodium salt, g | 1.75 |
| Hydroxypropyl sorbitol, g | 2.6 |

This solution was coated, by means of a No. 36 Mayer bar, onto a sheet of polyester treated with a suitable bonding layer and dried. A sample of the resulting film was then exposed to actinic light under a partially opaque master to give a black image in the unprotected, i.e., light-struckareas. The sample was then acidified and cleared. After aging another sample for three days as in example I the film still gave a black image on a clear background. By comparison, a control sample from which the hydroxy propyl sorbitol (but not the N,N'diphenyl ethylene diamine) had been eliminated gave poorer density and brightness readings both before and after aging. (The amount of background coloration was measured with a photoelectric brightness meter, using White Cararra glass as the brightness standard.) These results are summarized below:

| | Before Aging | | After 3 day's aging at 50° C. | |
|---|---|---|---|---|
| | Brightness | Dmax | Brightness | Dmax |
| Control | 61.0 | 1.95 | 52.5 | 1.72 |
| Test sample | 65.0 | 2.00 | 54.0 | 1.86 |

EXAMPLE V

A light-sensitive coating formulation comprising the following components was prepared.

| Component | Amount |
|---|---|
| "half-second acetate" (low-viscosity cellulose diacetate) | 16 g. |
| methanol | 30 cc. |
| acetone | 70 cc. |
| polypropylene glycol (average molecular weight 400) | 3 cc. |
| ortho-sulfobenzaldehyde sodium salt | 1.44 g. |
| 2-hydroxy-3-naphthoic acid-ortho-anisidide | 1.05 g. |
| 1-hydroxy-2-naphthoic acid piperidide | 0.645 g. |
| N-isopropyl, N-cyclohexyl amine | 1.28 g. |
| N,N'diphenyl ethylene diamine | 0.5 g. |
| 4-(N-ethyl, N-benzylamino)-benzene diazosulfonate, sodium salt | 1.75 g. |
| hydroxypropyl sorbitol | 2.6 g. |

This solution was coated by means of a No. 36 Mayer bar, onto a sheet of ethyl cellulose-treated, baryta-sized paper and dried. A sample of the resulting sheet was then exposed to actinic light under a partially opaque master to give a black image in the unprotected, i.e., light-struckareas. It was then acidified and cleared. Another sample was tested for shelf life stability by placing it in a package in an oven at 50° C. for 4 days. When removed and printed it still gave a dense black image on a clear background. By comparison, a control sample from which the hydroxy propyl sorbitol had been eliminated gave much lower density after aging as shown by the following comparison of the maximum density (Dmax) of the image obtained after exposure and clearing, as measured by a photoelectric densitometer calibrated for visual density according to the ASA specification for reflectance density, PH2.17-1958:

| | Initial Dmax | Dmax after 4 day's aging at 50° C. |
|---|---|---|
| Control | 1.74 | 0.92 |
| Test sample | 2.08 | 1.96 |

While the invention has been described with reference to preferred embodiments thereof, it is understood that various other changes and modifications thereof will occur to a person of ordinary skill in the art without departing from the spirit and scope of the invention, as defined by the appended claims.

What is claimed is:

1. In a light-sensitive diazo composition which comprises a para-amino benzene diazosulfonate, an azo coupling component, and a substantially nonvolatile amine, the improvement which comprises including in said composition an antioxidant having a general formula of ArNH—R—HNAr wherein Ar is a phenyl group or a hydrocarbyl-substituted phenyl group wherein the hydrocarbyl substituents are in either the meta or para position, and R is a divalent hydrocarbon radical having a chain of either two or three carbon atoms separating the nitrogen atoms of the diamine, said nonvolatile amine and said antioxidant being different chemical compounds.

2. The composition according to claim 1 wherein said antioxidant is a compound having the general formula given and Ar is a phenyl, meta-tolyl, or para-tolyl group; and R is an ethylene, a methyl-substituted ethylene, a 1,2-dimethyl-substituted ethylene, an ethyl-substituted ethylene or a phenyl-substituted ethylene group.

3. The composition according to claim 1 which further includes a humectic, organic polyhydroxy compound.

4. The composition according to claim 3 wherein the humectic, polyhydroxy compound is a hydroxy propyl sorbitol.

5. A reversal diazo photoreproduction material comprising a support and a photosensitive layer coated on a surface of the support, the layer comprising the light-sensitive diazo composition according to claim 1.

6. A photosensitive material comprising a support and a diazo layer coated on said support, the layer comprising the light-sensitive diazo composition according to claim 3.

* * * * *